Nov. 21, 1967  F. DI PAOLO  3,353,592

TEMPERATURE CONTROLLING APPARATUS

Filed Oct. 22, 1965  4 Sheets-Sheet 1

Nov. 21, 1967　　　F. DI PAOLO　　　3,353,592
TEMPERATURE CONTROLLING APPARATUS
Filed Oct. 22, 1965　　　　　　　　　　4 Sheets-Sheet 2
FIG. 2
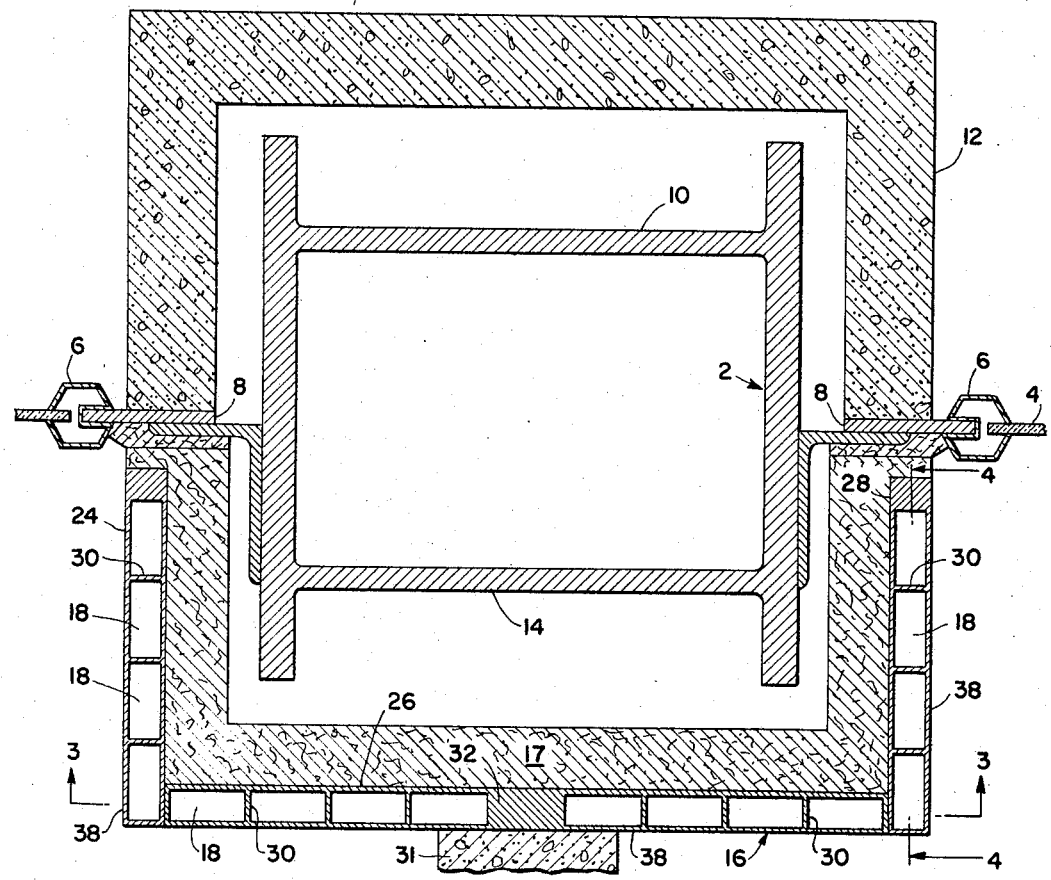
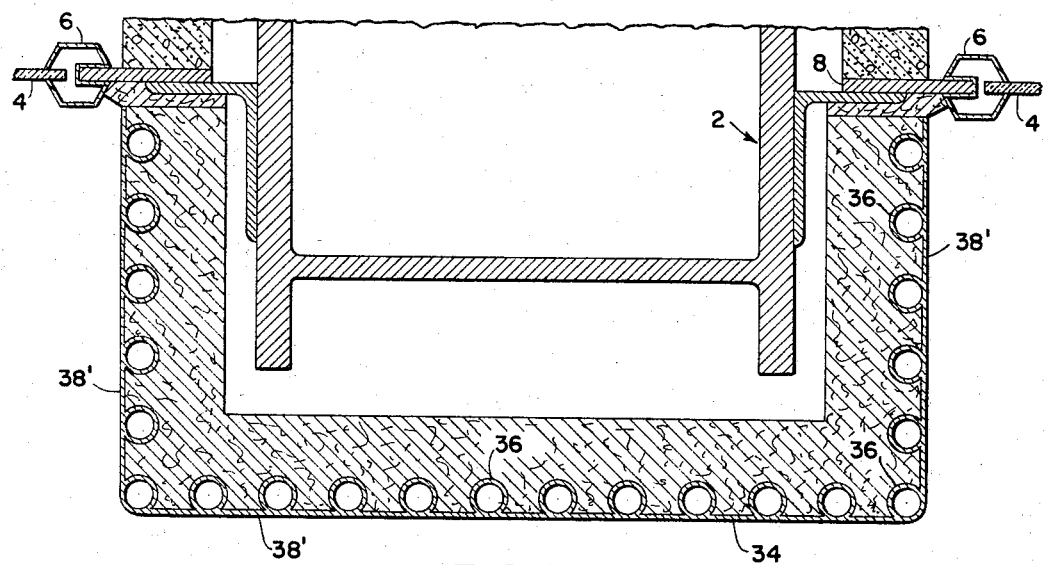
FIG. 5

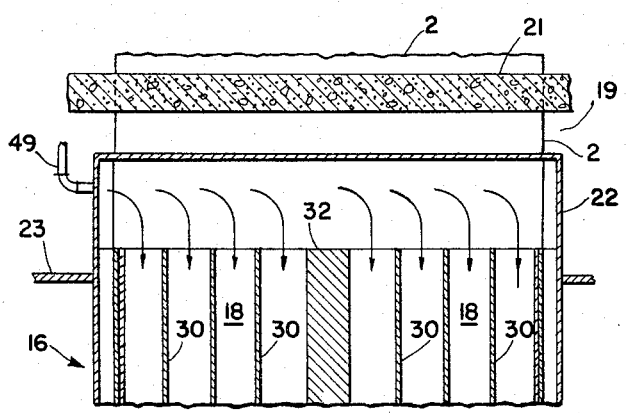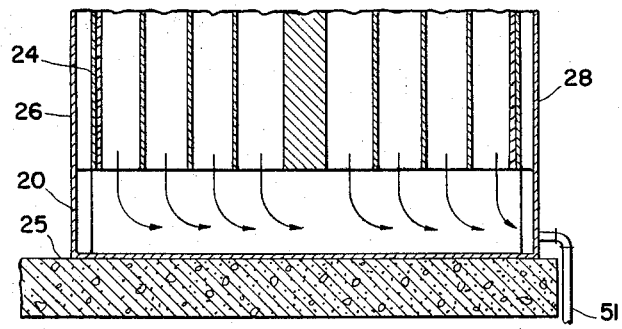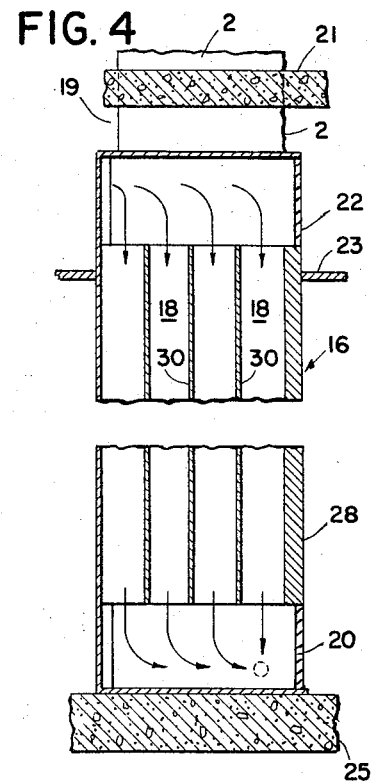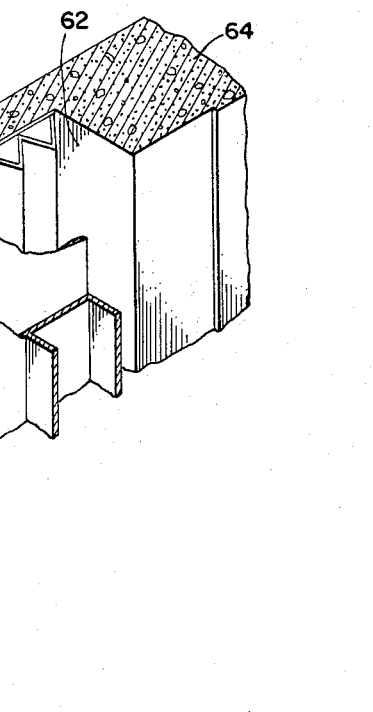
FIG. 3
FIG. 4
FIG. 8

United States Patent Office 3,353,592
Patented Nov. 21, 1967

3,353,592
TEMPERATURE CONTROLLING APPARATUS
Fiorino Di Paolo, 1257 E. 102nd St.,
Brooklyn, N.Y. 11236
Filed Oct. 22, 1965, Ser. No. 501,785
12 Claims. (Cl. 165—50)

ABSTRACT OF THE DISCLOSURE

A system for controlling temperature in buildings which combines a heating and cooling system for the interior of the building and a series of panels or jackets having radiating surfaces around the columns of the building for stabilizing the thermal loading of the building's peripheral zone.

---

This invention relates to apparatus for controlling temperature in buildings, and more particularly to apparatus for stabilizing the thermal loading in zones of the building which are adjacent its peripheral walls.

In a typical modern building construction, the upper stories are suspended from and supported by a network of vertical structural columns. Unlike earlier methods of construction, the peripheral walls are not load bearing, and consequently the architect has a greater range of materials from which to choose in enclosing his building. Very often the choice will include large areas of glass and similar lightweight materials which while aesthetically pleasing, create problems in maintaining comfortable temperatures inside the building.

Because of their light weight and relative thinness, the materials for the peripheral walls often have exhibited comparatively poor insulating qualities, and there can be a substantial transfer of heat through these walls. Where large glass areas are employed, the effect of radiation heat transfer becomes particularly acute. This effect is most immediately felt by those who are in the peripheral areas of the building adjacent the enclosing walls, and because radiation heat can be sharply affected by such common and frequent occurrences as, for example, the sun's moving behind a cloud, the demands for auxiliary heating or cooling in this area can fluctuate frequently and sharply. Contrasted to this is the relatively stable interior of the building which is insulated by the peripheral area from such outside influences. In the interior, the thermal loading is affected primarily by such factors as body and machinery heat which remain relatively uniform. While these factors also form part of the thermal loading in the peripheral area, the additional influence of the heat transfer through the building walls in this area has the effect of creating two distinct zones, each with sharply differing thermal requirements. Consequently, an attempt by a single central heating and cooling system to maintain a desirable temperature in one zone frequently results in discomfort to those in the other zone.

Heretofore, attempts to alleviate this problem frequently have included the provision of separate and independently controlled systems for each zone, with each system arranged to provide heating, cooling, ventilating and air conditioning for the corresponding zone. In the peripheral zone, the system often included radiating units which were located adjacent the windows of the building. While such dual systems are generally effective, they have several disadvantages, not the least of which is the increased installation cost necessitated by a duplication of ducting, fans, etc., and the need for a comparatively large area to accommodate the necessary mechanical equipment. Another disadvantage is that in modern building construction it is often the architect's intent to create strong vertical lines, uninterrupted as they extend between stories of the building. Consequently, it is undesirable from an architectural point of view to use a system of window units which interrupt and interfere with these lines. Still another disadvantage is that where forced air is employed it can be noisy, and many people object to the draft created.

In overcoming these disadvantages, it is an object of this invention to provide unique and economical apparatus for controlling the temperature in the occupied zones of a building.

Another object of the invention is to provide such apparatus which is integrated with the building's architectural design and performs the functions of heating, cooling, insulating and also forms a finished surface for the interior of the building.

It is another object of this invention to provide apparatus for neutralizing the effect of heat transfer through building walls.

A further object of this invention is to provide apparatus for stabilizing the thermal loading in the peripheral zones of buildings.

It is still another object of this invention to provide auxiliary heating and cooling apparatus for neutralizing the effect of heat transfer through the building walls so that a single main heating and cooling system controls the temperature in both the peripheral and interior zones of the building.

In accomplishing the foregoing objects, a principal feature of the invention resides in the provisions of a thermal panel of unique construction and arrangement. In certain advantageous embodiments, several such panels are provided, and each panel is formed to jacket or enclose the interior portion of a vertical supporting column located at the periphery of the building. The panels define passages for the circulation of a thermal fluid which preferably comprises water or other liquid. As the fluid circulates through these panels, the surrounding area is heated or cooled by radiation and convection. By regulating the temperature and flow of this fluid, the effect of heat transfer through the building walls is neutralized, and the peripheral zone takes on the characteristics of the interior zone with substantially identical thermal loading. Consequently, a main temperature control system may be employed including a single centrally located unit which provides heating or cooling at the same rate to both zones. Illustratively, such a central unit would be a forced air system much like that employed in a two unit system without the thermal panels, modified to the extent that the capacity of the unit would be increased to accommodate the larger area treated.

In some embodiments a layer of insulation is interposed between the panel and the column to further reduce heat loss from the panel to the outside of the building and, where required, to fireproof the column. In addition, by arranging the panel along the column there is little or no interference with the vertical lines of the building.

In several good arrangements, the panel extends with and covers the column from floor to ceiling, and where the intervening layer of insulation is of a settable composition which is poured in place, the panel may be employed as a form for the pouring. The panel, in addition to its temperature control function, may serve as an interior covering for the column, and its surface may be treated to complement the interior design and furnishing. The panel also may be constructed for use as a base for hanging interior walls or partitions, and in some embodiments the panel may be flush mounted in a wall of the building.

In situations where the thermal loading caused by body and machinery heat within the building is not substantial, it is contemplated that the peripheral system of panels alone would be adequate to control the building temperature. In situations in which a main temperature control system is employed in addition to the peripheral panels, the main system also could comprise thermal panels mounted on interior columns or flush mounted in the interior walls.

Other objects, features and advantages of the invention will become more readily apparent from an examination of the following detailed description of certain preferred embodiments, when read with reference to the accompanying drawings, in which FIG. 1 is a schematic plan view of a floor of a building having a centrally located heating and cooling unit and an auxiliary system for the peripheral zone constructed according to one illustrative embodiment of the invention;

FIG. 2 is a horizontal sectional view of a column of the structure of FIG. 1 showing the installation of a thermal jacket;

FIG. 3 is a sectional view of the thermal jacket taken along the line 3—3 of FIG. 2, with portions shown broken away;

FIG. 4 is a sectional view of the thermal jacket taken along the line 4—4 of FIG. 2, with portions shown broken away;

FIG. 5 is a fragmentary horizontal sectional view of a building column installation showing an alternative construction of the thermal jacket;

FIG. 8 is a fragmentary perspective view of an alternative installation for the thermal jacket.

Figure 1:
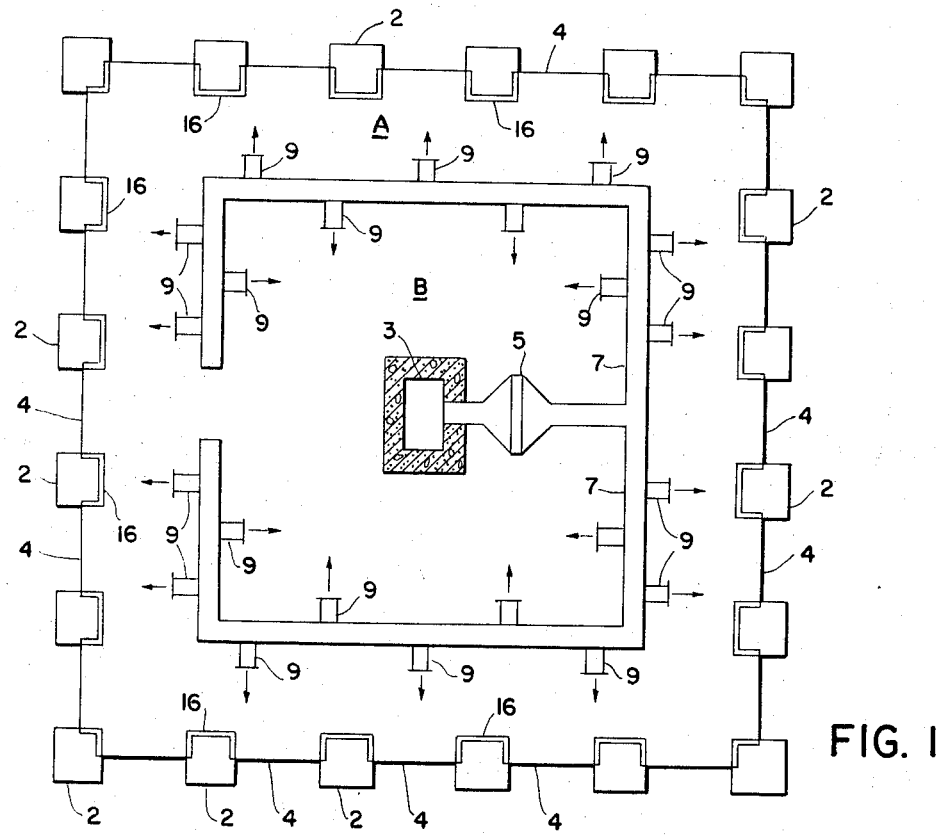

Referring to the drawings, FIGURE 1 shows schematically the floor plan of a typical building construction which includes a number of vertical structural columns 2 located at the building periphery. Columns 2 illustratively are of enclosed, generally rectangular construction, and, as best shown in FIG. 2, serve as anchors for glass wall sections 4 to which they are attached by sealing gaskets 6 and brackets 8. A central heating and cooling riser 3 (FIG. 1), leading from a source of thermally-treated forced air (not shown), is disposed within the central portion of the building and is provided with a thermally responsive control unit 5. Unit 5 is of conventional construction and serves to regulate the flow of forced air to the floor from riser 3 through conduits 7 and registers 9. The floor plan of FIGURE 1 is drawn as having a peripheral area or zone A which is exposed to the influence of heat transfer through the walls 4, and an interior, relatively insulated zone B. The registers 9 feed air at a controlled temperature to both zones A and B.

A first portion 10 (FIGURE 2) of each column 2 protrudes outwardly from wall sections 4 and is enclosed by a sheath 12 which may be of any suitable material such as concrete. A second portion 14 extends inside the building and is enclosed with a thermal jacket 16 which extends from the floor 25 to the ceiling 23 and into the space 19 (FIGURE 3) between the ceiling and the upper floor 21. The jacket 16 is disposed around an intervening layer of thermal insulation 17, to which the jacket is bonded or otherwise fastened, and which serves to fireproof the column 2 and to direct the effect of heat transfer from the jacket into the building. In certain good embodiments, the insulation 17 is attached to the jacket 16 at the time the jacket is fabricated, as by an adhesive or by suitable mechanical fasteners, and the assembled structure is transported to the building for installation. In other particularly advantageous arrangements, the insulation 17 is of a settable composition which may be poured in place, and the jacket 16 is installed first with a space between it and the column 2 and is then used as a form for pouring the insulation.

As best shown in FIGURES 3 and 4, the jacket 16 comprises a hollow, generally flattened panel structure having a plurality of vertical internal passages 18 which terminate at opposite ends in headers 20 and 22. In a manner that will become more fully apparent hereinafter, the headers 20 and 22 connect these passages to a source of thermal fluid. The header 22 is concealed in the space 19 between the ceiling 23 and the upper floor 21. While it would be preferable for the purposes of appearance to similarly conceal the header 20 by penetrating the lower floor 25, in many cases such a penetration would produce an undesirable weakening of the floor's structural integrity. Where this condition exists, the header 20 is located above the floor 25, and the joint between the header 20 and the panel structure is concealed by suitable decorative molding or is made esthetically acceptable.

The actual construction of the thermal jacket may vary considerably. For example, in FIGURE 2, the jacket 16 includes three hollow rectangular panels 24, 26 and 28 of extruded aluminum or other good heat conducting material. The internal passages 18 of these panels are formed by vertically extending transverse webs 30, and the panels are welded or otherwise hermetically attached to the cast aluminum headers 20 and 22. Where the column 2 is to serve as a base for hanging an internal wall or partition 31, a thickened web 32 is provided for structural support and to facilitate the attachment of the partition to the jacket.

In another form of construction, the jacket is extruded in a single contiguous piece. As an illustration, in FIGURE 5 there is shown a jacket which comprises a panel in the form of a single aluminum sheet 34. The sheet 34 is formed with vertically extending tubular passages 36, and its outwardly facing portions define radiating surfaces 38'.

Because the radiating surfaces 38 and 38' may be finished in any number of ways, the jackets serve a multiple function, both as an element of a heating and cooling system, and also as a decorative cover for the columns 2. The finish of these surfaces may be uniform throughout the building or they may vary from floor to floor, or even from column to column, to suit the tastes of the occupant. In some cases, where the finish includes a roughened surface, the efficiency of the jacket is enhanced by increasing the radiating area. Moreover, because the jackets are coextensive with the columns, they are readily integrated into the architectural design of the building.

Figure 6:
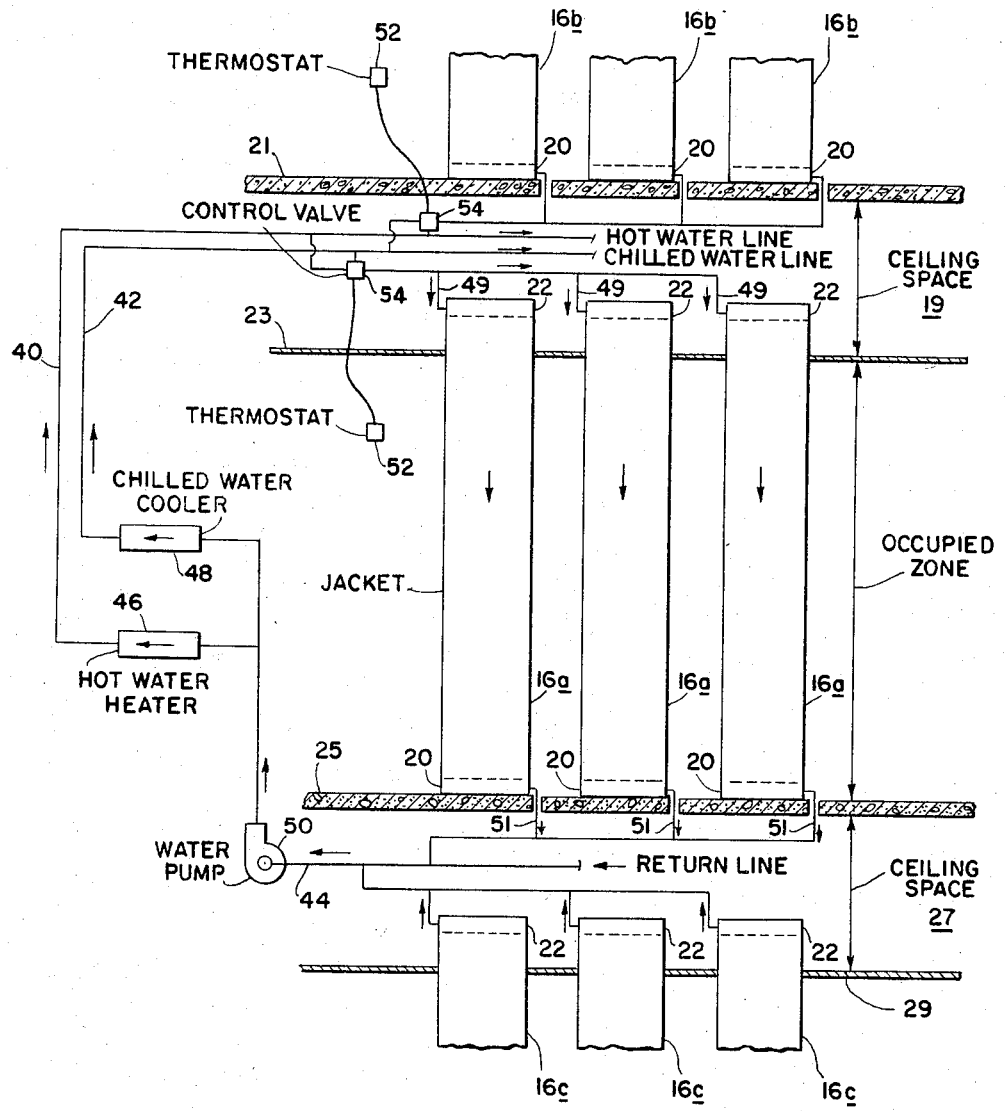
FIG. 6 is a schematic diagram of a thermal jacket system.

Referring to FIGURES 1 and 6 and to the jacket structure shown in FIGURES 2-4, a heating and cooling system for a floor of a building is shown in which a number of thermal jackets 16 are mounted on columns 2 about the building perimeter. Depending upon the individual design requirements, a jacket may be provided for each column, or fewer jackets than columns may be employed. Except as subsequently noted, the installation for each floor will be essentially the same, and hence for the most part only one will be described.

In the illustrated arrangement, a three pipe system is employed for supplying fluid to jackets 16. Such a system utilizes separate conduits 40, 42 for heated and chilled fluid, respectively, and a common return conduit 44. Other systems which may be employed include a two pipe system, with either hot or cold fluid supplied through one pipe and returned through the other, or a four pipe system in which the hot and cold fluids have separate supply conduits and separate return conduits. The choice of systems is dependent primarily upon a balance among considerations of operating economy, versatility, and cost of installation. The two pipe system is relatively inexpensive to install but is limited in its operation. The four pipe system is highly efficient in operation because there is no mixing of the thermal fluids, but its installation is comparatively costly. Generally, the three pipe system is preferred as a compromise among desired results.

Heating and cooling sources for the fluid, which may be remotely located, are illustrated schematically at 46 and 48. The pressure for the fluid is supplied by a pump 50. The lateral piping for the system is concealed in the spaces 19 and 27 formed by the ceilings 23 and 29 and the floors 21 and 25 above them. To conserve space and material, each supply conduit and return conduit services two floors. Consequently, the jackets 16 are connected so that entry of fluid at one story is from the top (such as the fluid entering the jackets 16a in FIGURE 6) and entry of fluid at the stories above and below (e.g., the fluid entering the jackets 16b and 16c) is from the bottom.

In describing a story of the building where fluid entry is from the top, fluid is fed from either the conduit 40 or the conduit 42, depending on whether heated or cooled fluid is desired, into pipes 49 located in the ceiling space 19. The fluid then passes through the headers 22 and into the passages 18 (FIGURE 2) to heat or cool the surfaces 38, returning via pipes 51 which extend from the headers 20 through the floor 25 to the return conduit 44 in the ceiling space 27. The surfaces 38 heat or cool the surrounding area by radiation and convection.

By regulating the flow of fluid in accordance with the amount of heat transferred through the building walls, as detected by thermostats 52 which control valves 54, the effect of this heat transfer is neutralized, and the peripheral zone A (FIGURE 1) acquires the same thermal characteristics as the interior zone B. While this neutralization takes place in part through the action of the jacket 16 as an auxiliary source of heating or cooling, there is also believed to be a secondary "thermal barrier" effect produced, particularly when the flow of heat is from the outside of the building to the inside. Because of the relatively large area of surfaces 38, and because jakets 16 extend the length of columns 2, there is a tendency for jackets 16 to absorb directly a portion of the heat transferred into the building. Thus, radiation striking surfaces 38 would be directly absorbed by it, as would any heat transferred directly through columns 2.

Figure 7:
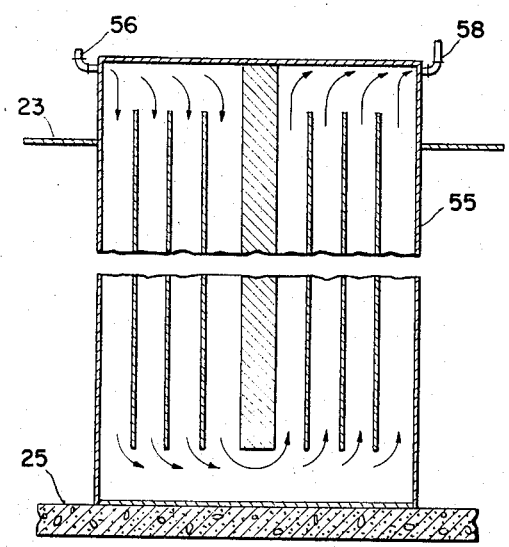
FIG. 7 is a sectional view of a thermal jacket, partially broken away, taken from the same viewpoint as that of FIG. 3 but showing an alternative fluid flow pattern.

For simplicity of installation, the single pass flow pattern illustrated in FIGURES 2, 3, and 6, that is, a pattern in which the fluid flows from one end of each jacket to the other, is particularly advantageous. However, a double pass arrangement also may be employed with good effect. An arrangement of this latter type is illustrated in FIGURE 7 and includes a jacket 55 having a supply conduit 56 and return conduit 58 at the same level adjacent the header at the top of the jacket. Where fluid entry and return is adjacent the header at the bottom of the jacket, the upper header is vented.

Because of the stabilization of the thermal loading in peripheral zone A by the operation of thermal jackets 16, factors influencing the requirements for heating and cooling in this area are principally body heat and machinery heat (including electric lighting). In most cases, the effect of these factors in peripheral zone A is not substantially different from that in interior zone B. Consequently, heating or cooling supplied to both zones can be provided from a central supply, illustrated by riser 3, and can be controlled by a single unit 5. The size of such a main unit is generally larger than that of the central unit employed in a system using a separate unit for the peripheral zone. However, this size increase is the result of the larger treated, and the cost of such an enlarged installation is considerably less than the cost of installing two units.

In some situations, particularly where the influence of body and machinery heat on the thermal loading it not substantial, it is contemplated that the peripheral system of thermal jackets may be employed without the central unit. In other cases the central unit may comprise a second system of jackets positioned in the interior zone.

An alternative installation for the radiation panels which may be employed in place of, or in addition to, the column installation is shown in FIG. 8. In this case a panel 60 is flush mounted in a recess 62 in wall 64 with an intervening layer of insulation 66. Surface 68 of panel 60 is striated to improve its appearance and also to increase its radiating area.

Although heated or chilled water is generally preferred as the thermal fluid, it should be understood that other suitable fluids may be employed. Generally, it is desirable to maintain the heated fluid at a temperature such that the panel will not be uncomfortable to the touch, or about 110° Farenheit, and the cooled fluid at a temperature such that the panel temperature will be above the dew point of the zone.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In a building having vertically extending supporting columns around its periphery and wall members extending between said columns to enclose said building, portions of said columns extending into the occupied area between the floor and ceiling of a story of said building, a thermal radiation system comprising thermal jackets surrounding said portions of said columns and extending vertically from floor to ceiling with said columns, said jackets having radiating surfaces and internal passages for the circulation of thermal fluid, a portion of the radiating surface for each jacket extending in a plane substantially transverse to the adjacent wall member, means at the top and bottom of said jackets connecting said passages to a source of thermal fluid, and means for regulating the temperature of the thermal fluid to thereby stabilize the thermal loading of the peripheral portion of said occupied area.

2. In a building having vertically extending supporting columns around its periphery and transparent wall members extending between said columns to enclose said building, portions of said columns extending into the occupied area between the floor and ceiling of a story of said building, a thermal radiation system comprising thermal jackets surrounding said portions of said columns and extending vertically from floor to ceiling with said columns, said jackets having radiating surfaces and internal passages for the circulation of a thermal fluid, a portion of the radiating surface for each jacket extending in a plane substantially transverse to the adjacent wall member, means at the top and bottom of said jackets for connecting said panels to a source of thermal fluid, means for regulating the temperature of said thermal fluid to counteract the effect of heat transfer between the occupied area and the outside of said building through the walls of said building and thereby stabilize the thermal loading thereof, and a layer of thermal insulation between said jackets and said columns.

3. In a building having vertically extending columns around its periphery and wall members between said columns to enclose said building, portions of said columns extending into the occupied area between the floor and ceiling of a story of said building, said occupied area including an interior zone having relatively stable thermal loading and a peripheral zone which is subject to fluctuations in heat transfer through said building walls, the combination comprising means connected to said interior zone for controlling the temperature in said building, and neutralizing means for compensating for the fluctuations in said peripheral zone, whereby the thermal characteristics of both said interior and peripheral zones are equalized, said neutralizing means comprising thermal jackets surrounding said portions of said columns and extending from floor to ceiling with said columns, said jackets having radiating surfaces and a plurality of interior passages for the circulation of a thermal fluid, means connecting said passages to a source of thermal fluid, and means for regulating the flow of said fluid to compensate for said heat transfer.

4. In a building having stories with occupied areas divided into an interior zone having relatively stable thermal loading and a peripheral zone which is subject to fluctuations in heat transfer from the outside through the building walls, the combination comprising means connected to said interior zone for controlling the temperature in said building, and neutralizing means for compensating for the fluctuations in said peripheral zone, whereby the thermal characteristics of both said interior and peripheral zones are equalized, said neutralizing means comprising a plurality of thermal panels positioned in said peripheral zone adjacent said walls and extending vertically from floor to ceiling, said panels having radiation surfaces and a plurality of interior passages for the circulation of a thermal fluid, means for supplying thermal fluid to said passages, temperature responsive means for detecting heat transfer through said walls, and means responsive to said temperature responsive means for regulating the flow of said fluid to compensate for said heat transfer.

5. In a building having stories divided into an interior zone having relatively stable thermal loading and a peripheral zone which is subject to fluctuations in heat transfer between said zone and the outside of said building through its walls, in combination, first means providing thermally treated air to both of said zones, and second means for compensating for said fluctuations in said peripheral zones, whereby the thermal characteristics of both said interior and said peripheral zones are equalized so that the effect of said first means on both zones will be substantially the same, said second means comprising a plurality of thermal panels positioned in said peripheral zones adjacent said walls and extending vertically from floor to ceiling, said panels having radiation surfaces and a plurality of interior passages for the circulation of a thermal fluid to said passages, temperature responsive means for detecting heat transfer through said walls, and means responsive to said temperature responsive means for regulating the temperature of said fluid to compensate for said heat transfer.

6. A temperature control system for a building having vertically extending columns around its periphery and wall members between said columns to enclose said building, at least portions of said columns extending into the occupied area between the floor and ceiling of a story of said building, said temperature control system comprising thermal jackets enclosing said portions of a plurality of said columns, said jackets including radiation panels extending vertically along said columns and into the space between said ceiling and the floor above, said panels having radiating surfaces and internal passages, first and second headers respectively connected to the top and the bottom of said panels for interconnecting said passages, a source of thermally treated fluid connected to one of said headers, a fluid return connected to the other of said headers, said source and said return having piping concealed between floor and ceiling of adjacent stories of said building, means for regulating the flow of said fluid to said headers responsive to the transfer of heat through said walls, and separate means for regulating the temperature in said building.

7. A temperature control system according to claim 6 wherein the bottom of each of said panels terminates at a point above the floor of said story and said second headers are positioned above the floor of said story.

8. A temperature control system for a building having vertically extending columns around its periphery and wall members between said columns to enclose said building, at least portions of said columns extending into the occupied area between the floor and ceiling of a story of said building, said occupied area including an interior zone having relatively stable thermal loading and a peripheral zone which is subject to fluctuations in heat transfer through said walls, said temperature control system comprising thermal jackets enclosing said portions of a plurality of said columns, said jackets including radiation panels extending vertically along said columns and into the space between said ceiling and the floor above, said panels having radiating surfaces and internal passages, first and second headers respectively connected to the top and the bottom of said panels for interconnecting said passages, a source of thermally treated fluid connected to one of said headers, a fluid return connected to the other of said headers, said source and said return having piping concealed between the ceiling and floor of adjacent stories of said building, means for regulating the flow of fluid to said headers responsive to the transfer of heat through said walls to said peripheral zone, whereby the effect of said heat transfer into said peripheral zone is neutralized, and separate means regulating the temperature in both said peripheral and said interior zone.

9. In a building including an interior zone having relatively stable thermal loading and a peripheral zone which is subject to fluctuations in heat transfer between said peripheral zone and the outside of said building through its walls, in combination, first means providing thermally treated air to at least one of said zones, and second means for compensating for said fluctuations in said peripheral zone, said second means comprising a plurality of thermal panels positioned in said peripheral zone adjacent said walls, said panels having radiation surfaces and a plurality of interior passages for the circulation of a thermal fluid to said passages, temperature responsive means for detecting heat transfer through said walls, and means responsive to said temperature responsive means for regulating the temperature of said fluid to compensate for said heat transfer.

10. In a building including an interior zone having relatively stable thermal loading and a peripheral zone which is subject to fluctuations in heat transfer between said peripheral zone and the outside of said building through its walls, in combination, first means connected to said interior zone for supplying thermally treated air thereto, and second means for compensating for said fluctuations in said peripheral zone to thereby stabilize the thermal loading thereof, said means comprising a plurality of thermal panels positioned in said peripheral zone adjacent said walls, said panels having radiation surfaces and a plurality of interior passages for the circulation of a thermal fluid to said passages, temperature responsive means for detecting heat transfer through said walls, and means responsive to said temperature responsive means for regulating the temperature of said fluid to compensate for said heat transfer.

11. In a building including an interior zone having relatively stable thermal loading and a peripheral zone which is subject to fluctuations in heat transfer between said peripheral zone and the outside of said building through its walls, said building being provided with vertically disposed columns having portions extending into said peripheral zone, in combination, first means providing thermally treated air to both of said zones, and second means for compensating for said fluctuations in said peripheral zone, whereby the thermal characteristics of both said interior and said peripheral zones are equalized so that the effect of said first means on both zones will be substantially the same, said second means comprising a plurality of thermal panels positioned in said peripheral zone around said column portions, said panels having radiation surfaces and a plurality of interior passages for the circulation of a thermal fluid to said passages, temperature responsive means for detecting heat transfer through said walls, and means responsive to said temperature responsive means for regulating the temperature of said fluid to compensate for said heat transfer.

12. In a building having vertically extending supporting columns around its periphery and wall members extending between said columns to enclose said building, portions of said columns extending into the occupied area between the floor and ceiling of a story of said building, a thermal radiation system comprising thermal jackets surrounding said portions of said columns and extending vertically with said columns, said jackets having radiating surfaces and internal passages for the circulation of thermal fluid, a portion of the radiating surface for each jacket extending in a plane substantially transverse to the adjacent wall member, means connecting said passages to a source of thermal fluid, and means for regulating the temperature of the thermal fluid to thereby stabilize the thermal loading of the peripheral portion of said occupied area.

References Cited

UNITED STATES PATENTS

| | | | |
|---|---|---|---|
| 2,664,740 | 1/1954 | Cochrane | 52—495 X |
| 3,136,395 | 6/1964 | Rebele | 52—495 X |
| 3,140,763 | 7/1964 | Edelstein | 52—495 X |
| 3,171,471 | 3/1965 | Blum | 165—50 X |
| 3,246,689 | 4/1966 | Remde et al. | 163—53 |

FOREIGN PATENTS

| | | |
|---|---|---|
| 453,003 | 9/1936 | Great Britain. |
| 559,872 | 3/1944 | Great Britain. |

ROBERT A. O'LEARY, *Primary Examiner.*

M. A. ANTONAKAS, *Assistant Examiner.*